(12) United States Patent
Strozier et al.

(10) Patent No.: US 11,262,814 B2
(45) Date of Patent: Mar. 1, 2022

(54) PUSH-PULL COMPUTER COOLING APPARATUSES AND METHODS FOR MAKING AND USING SAME

(71) Applicants: Scott A Strozier, Houston, TX (US); Christopher D. Robinson, Houston, TX (US)

(72) Inventors: Scott A Strozier, Houston, TX (US); Christopher D. Robinson, Houston, TX (US)

(\*) Notice: Subject to any disclaimer, the term of this patent is extended or adjusted under 35 U.S.C. 154(b) by 0 days.

(21) Appl. No.: 16/363,740

(22) Filed: Mar. 25, 2019

(65) Prior Publication Data

US 2021/0141427 A1     May 13, 2021

Related U.S. Application Data

(60) Provisional application No. 62/648,816, filed on Mar. 27, 2018.

(51) Int. Cl.
*G06F 1/20* (2006.01)

(52) U.S. Cl.
CPC .......... *G06F 1/20* (2013.01); *G06F 2200/201* (2013.01)

(58) Field of Classification Search
CPC ........ F28F 2250/08; G06F 1/20; G06F 1/181; H05K 7/20572; H05K 7/20145; H05K 7/20272; H05K 7/207; H05K 7/20172; F28D 15/0233; F28D 2021/0028
USPC ..... 361/695, 690, 688, 679.5; 454/184, 252, 454/229; 165/126, 54
See application file for complete search history.

(56) References Cited

U.S. PATENT DOCUMENTS

| | | | | |
|---|---|---|---|---|
| 5,544,012 | A | * | 8/1996 | Koike ................ H05K 7/20572 361/695 |
| 5,949,646 | A | * | 9/1999 | Lee ...................... H05K 7/2019 361/695 |
| 2014/0099195 | A1 | * | 4/2014 | Jun ...................... F04D 25/0613 415/182.1 |
| 2018/0235106 | A1 | * | 8/2018 | Curtis ................ H05K 7/20145 |

\* cited by examiner

*Primary Examiner* — Mandeep S Buttar
(74) *Attorney, Agent, or Firm* — Robert W. Strozier

(57) ABSTRACT

Apparatuses and methods include at least one push fan assembly and at least one pull fan assembly and at least one constriction channel or pathway designed to compress air pulled in by the push fan so that as the compressed air exits the at least one constriction channel or pathway, the air undergoes an expansion and cools and the push-pull fan arrangement pulls the cooled air through the housing improving the cooling of computer or electronic components housed in the housing.

10 Claims, 20 Drawing Sheets

PUSH-PULL COMPUTER COOLING APPARATUSES AND METHODS FOR MAKING AND USING SAME

RELATED APPLICATIONS

This application claims priority to and the benefit of U.S. Patent Provisional Patent Application Ser. No. 62/648,816 filed 27 Mar. 2018 (Mar. 27, 2018).

BACKGROUND OF THE DISCLOSURE

1. Field of the Invention

Embodiments of the present disclosure relate to apparatuses for cooling computer systems.

In particular, embodiments of the present disclosure relate to apparatuses for cooling computer systems, computer components, or other electronic equipment or components housed in a housing amenable to fan cooling, where the apparatuses include at least one push fan and at least one pull fan and at least one constriction channel or pathway designed to compress air pulled in by the push fan so that as the compressed air exits the at least one constriction channel or pathway, the air undergoes an expansion and cools and the push-pull fan arrangement pulls the cooled air through the housing improving the cooling of computer or electronic components housed in the housing.

2. Description of the Related Art

While many apparatuses and methods have been purposed and produced for cooling computers, there is still a need in the art for newer and different cooling apparatuses.

SUMMARY OF THE DISCLOSURE

Embodiments of this disclosure provide apparatuses including a computer housing having an interior to be cooled. The apparatuses also include a push fan assembly and a pull fan assembly. The push fan assembly include a push fan housing including a push fan, at least one push fan inlet, and at least one constriction pathway having a pathway inlet and a pathway outlet. The pull fan assembly includes a pull fan housing including a pull fan, at least one pull fan air inlet, and at one pull fan outlet. The computer housing includes a computer power supply, circuit boards or other components including processing units, memory, external storage units, and other computer components. The assemblies may be attached to the computer housing so that air is pushed into and pulled out of the interior including the computer components to be cooled.

Embodiments of this disclosure provide apparatuses including a computer housing having an interior to be cooled, a push fan assembly and a pull fan assembly. The push fan assembly include a push fan housing including a push fan, at least one push fan inlet, and at least one constriction pathway having a pathway inlet and a pathway outlet. The pull fan assembly includes a pull fan housing including a pull fan, at least one pull fan air inlet, and at one pull fan outlet. The computer housing interior includes a computer power supply, circuit boards or other components including processing units, memory, external storage units, and other computer components.

BRIEF DESCRIPTION OF THE DRAWINGS OF THE DISCLOSURE

The disclosure can be better understood with reference to the following detailed description together with the appended illustrative drawings in which like elements are numbered the same:

FIGS. 1A-F depict an embodiment of an apparatus of this disclosure including a push-pull fan configuration showing air flow into, through and out of the embodiment.

FIGS. 2A-E depict another embodiment of an apparatus of this disclosure including another push-pull fan configuration showing air flow into, through and out of the embodiment.

Figure 6A:
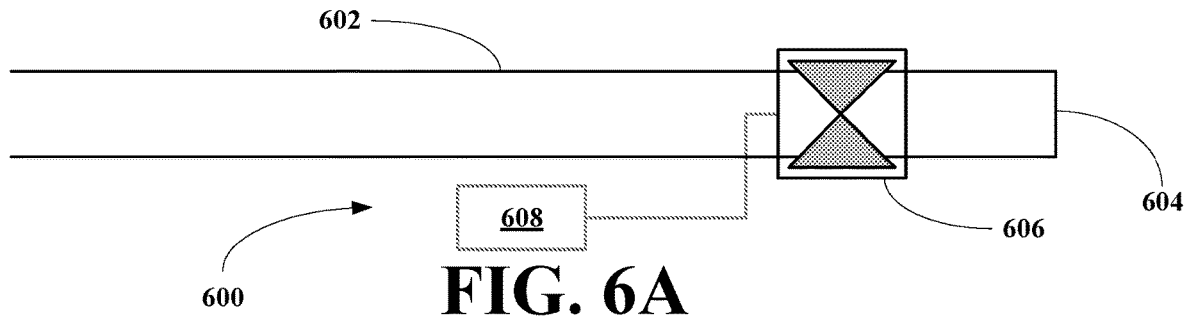

FIGS. 6A&B depict embodiments of restriction/constriction flow pathways including a control valve and a controller with or without a nozzle.

Figure 7A:
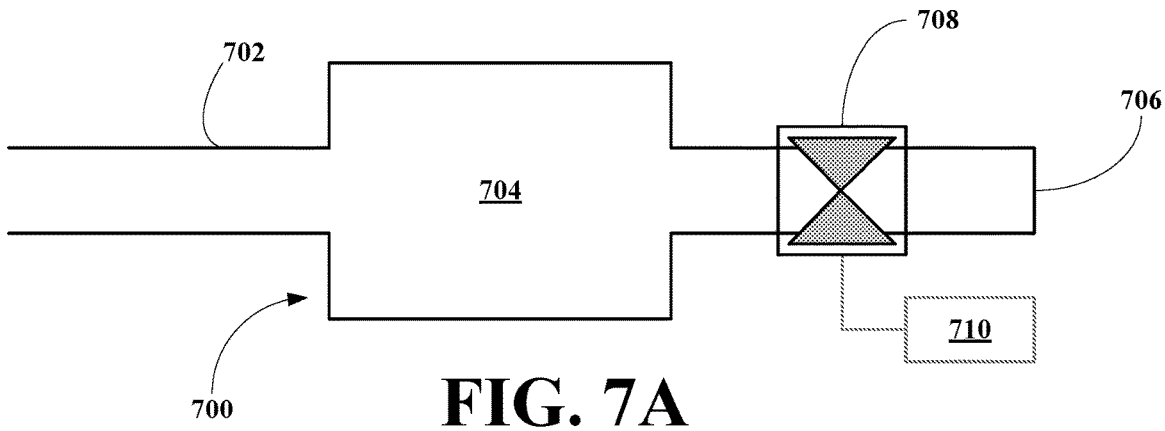

FIGS. 7A&B depict embodiments of restriction/constriction flow pathways including compression chamber, a control valve and a controller with or without a nozzle.

FIGS. 8A-H depict embodiments of members having constriction/restriction flow paths therethrough.

Figure 9B:
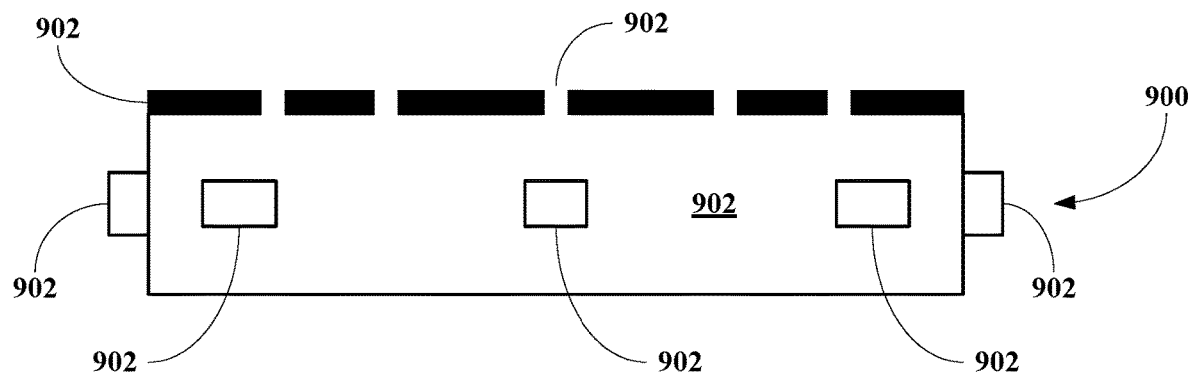
Figure 9A:
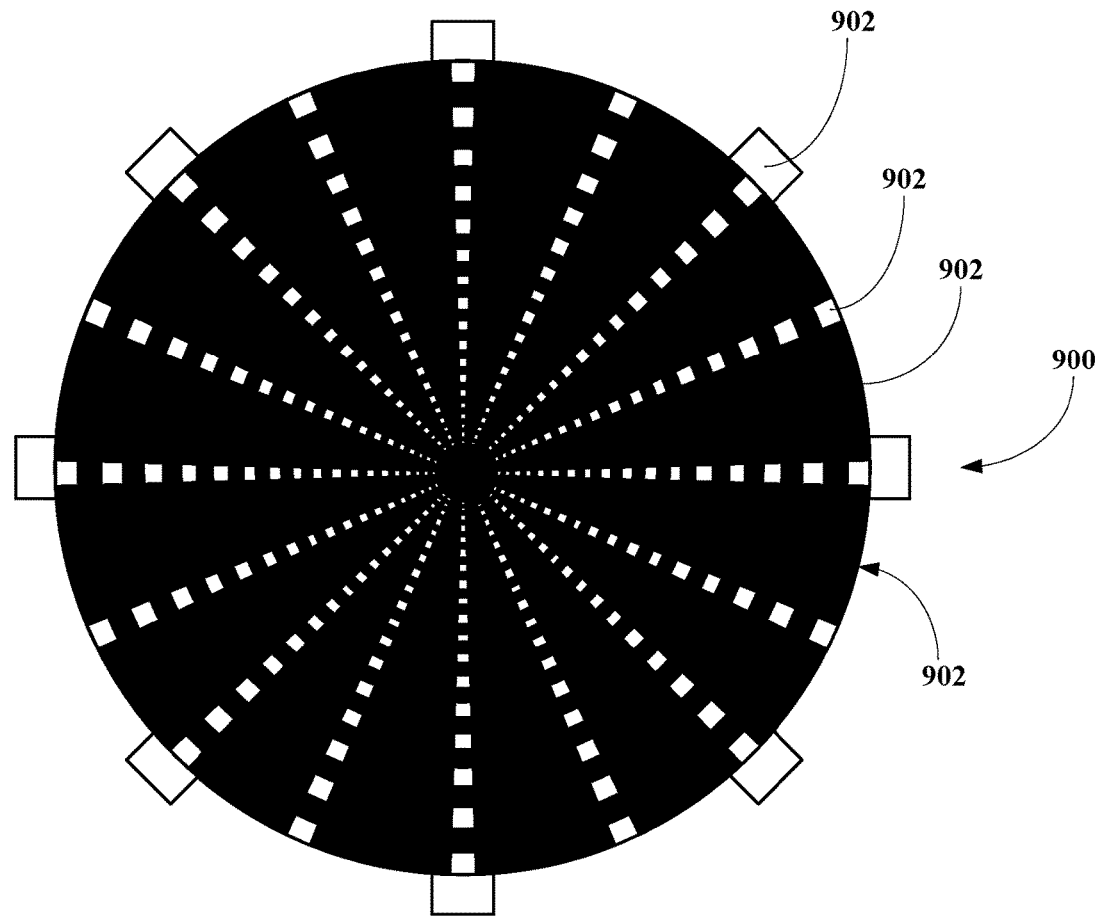

FIGS. 9A&B depict an embodiments of a push fan assembly including unidirectional valves.

DEFINITIONS USED IN THE DISCLOSURE

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

DETAILED DESCRIPTION OF THE DISCLOSURE

The inventors have found that cooling apparatuses and methods implements the cooling apparatuses, where the cooling apparatuses are designed to cool computers, computer components, electronic equipment, or electronic components housed in a housing and where the cooling apparatuses including at least one push fan, at least one pull fan, and at least one constriction channel that compresses the air as it enters the channel produced by the push fan so that as the air exits the at least one channel, the air expands and cools via adiabatic cooling and the pull fan pulls the cooled air through the housing and exhausts the air from the interior of the housing cooling all components therein. The components in the interior may be computer boards or any other electronic component, mechanical component or electromechanical component that requires cooling by air.

In certain embodiments, the constriction/restriction channels may be associated with a member through which the air flow produced by the push fan must pass through before entering the interior of the housing to be cooled so support air compression entering the channels and expansion upon exiting the channels resulting in cooling via expansion.

In other embodiments, the channels may include nozzles to direct the air flow and to increase compression and expansion. In other embodiments, the channels include control valves under control of a microprocessor or the computer processor is the housing houses a computer, where the control valves act to increase compression and thereby increasing cooling by expansion. In other embodiments, the channels include chambers into which air may be compressed. In other embodiments, the push fan assembly may include unidirectional intake valves that allow air to entire the fan housing, but not to exit through the fan housing except via the constriction/restriction channels.

Embodiments of this present disclosure provide cooling apparatuses comprising a housing including an interior to be cooled, a push fan assembly including at least one push fan and at least one constriction/restriction pathway or channel, and a pull fan assembly including at least one pull fan and at least one exhaust pathway. In certain embodiments, the push assembly further includes a member defining one or a plurality of constriction/restriction pathways or channels. In other embodiments, each pathway includes a control valve. In other embodiments, the push assembly further includes one or a plurality of unidirectional intake valves. In other embodiments, each pathway includes a compression chamber and a control valve. In other embodiments, the push fan assembly is disposed in or on a bottom of the housing and the pull fan assembly is disposed in or on a top of the housing or the push fan assembly is disposed in or on a side of the housing and the pull fan assembly is disposed in or on a top of the housing or the push fan assembly is disposed in or on a side of the housing and the pull fan assembly is disposed in or on an opposite side of the housing. In other embodiments, each pathway terminates in a nozzle. In other embodiments, the apparatus also includes intakes screens or intakes screens and an interior screen. In other embodiments, the push fan assembly include a plurality push fans and/or the pull fan assembly include a plurality pull fans.

Embodiments of this present disclosure provide cooling apparatuses comprising a housing including an interior to be cooled, a push fan assembly including at least one push fan, a member defining one or a plurality of constriction/restriction pathways or channels, and a pull fan assembly including at least one pull fan and at least one exhaust pathway. In certain embodiments, each pathway includes a control valve. In other embodiments, the push assembly further includes one or a plurality of unidirectional intake valves. In other embodiments, each pathway includes a compression chamber and a control valve. In other embodiments, the push fan assembly is disposed in or on a bottom of the housing and the pull fan assembly is disposed in or on a top of the housing or the push fan assembly is disposed in or on a side of the housing and the pull fan assembly is disposed in or on a top of the housing or the push fan assembly is disposed in or on a side of the housing and the pull fan assembly is disposed in or on an opposite side of the housing. In other embodiments, each pathway terminates in a nozzle. In other embodiments, the apparatuses further comprising intakes screens or intakes screens and an interior screen. In other embodiments, the push fan assembly include a plurality push fans, and/or the pull fan assembly include a plurality pull fans.

Embodiments of this present disclosure provide cooling apparatuses comprising a housing including an interior to be cooled, a push fan assembly including at least one push fan, a member defining one or a plurality of constriction/restriction pathways or channels including nozzles or narrow openings, and a pull fan assembly including at least one pull fan and at least one exhaust pathway. In certain embodiments, each pathway includes a control valve. In other embodiments, the push assembly further includes one or a plurality of unidirectional intake valves. In other embodiments, each pathway includes a compression chamber and a control valve. In other embodiments, the push fan assembly is disposed in or on a bottom of the housing and the pull fan assembly is disposed in or on a top of the housing or the push fan assembly is disposed in or on a side of the housing and the pull fan assembly is disposed in or on a top of the housing or the push fan assembly is disposed in or on a side of the housing and the pull fan assembly is disposed in or on an opposite side of the housing. In other embodiments, the apparatuses further comprising intakes screens or intakes screens and an interior screen. In other embodiments, the push fan assembly include a plurality push fans, and/or the pull fan assembly include a plurality pull fans.

Embodiments of this present disclosure provide methods comprising pushing air into an interior of a housing to be cooled through at least one constriction/restriction pathway associated with the push fan assembly an apparatus of claim 1, wherein the air is compressed as it enter and flow through the pathway and expands and cools as it exits the pathway, and pulling air through the interior and out of the exhaust pathway associated with the pull fan assembly.

Suitable Components for Use in the Disclosure

Suitable processing units or processors include, without limitation, any processing unit capable of executing programs. The processors can be digital, analog, quantum or any other type or processing unit capable of executing programs.

Suitable digital processing units (DPUs) include, without limitation, any digital processing unit capable of accepting input from a singular or plurality of devices, touches, or objects and converting at least some of the input into output designed to select and/or control attributes of one or more of the devices or objects. Exemplary examples of such DPUs include, without limitation, microprocessor, microcontrollers, or the like manufactured by Intel, Motorola, Erricsson, HP, Samsung, Hitachi, NRC, Applied Materials, AMD, Cyrix, Sun Microsystem, Philips, National Semiconductor, Via Electonics, Qualcomm, or any other manufacture of microprocessors or microcontrollers.

Suitable analog processing units (APUs) include, without limitation, any analog processing unit capable of accepting input from a singular or a plurality of devices, touches, or objects and converting at least some of the input into output designed to control attributes of one or more of the devices or objects. Such analog devices are available from manufacturers such as Analog Devices Inc.

Suitable micro control valves include, without limitation, micro valves manufactured by Metal Work Pneumatic, Clippard, Camozzi, Aventics, Festo, Vuototecnica, Aro, Samson, Univer, Automax, Aignep, Fadco-Air, Kendrion, and other similar valves.

Suitable display devices include, without limitation, cathode ray tube display (CRT) devices, light-emitting diode display (LED) devices, electroluminescent display (ELD) devices, electronic paper (E Ink) devices, plasma display panel (PDP) devices, liquid crystal display (LCD) devices, organic light-emitting diode display (OLED) devices, projection devices, rear projection devices, holographic devices, other devices for displaying information in 2D, 3D, or 4D.

Suitable materials from which the members having constriction/restriction flow paths therethrough include, without limitation, metals, plastics, composites, ceramics, or mixtures thereof.

Detailed Description of Drawings of the Disclosure

Referring now to FIGS. 1A-F, an embodiment of a push-pull cooling system/apparatus, generally 100, is shown to include a housing 102 having a top 104, a bottom 106, sides 108, and an interior 110 including electronic components 112 to be cooled. The apparatus 100 also includes a push fan assembly 120 disposed on or at the bottom 106 of the housing 102 and a pull fan assembly 140 disposed on or at the top 104 of the housing 102.

The push fan assembly 120 includes a push fan housing 122 having a push fan top 124, a push fan bottom 126, push fan sides 128 having screens 130, and a push fan interior 132 including a push fan 134 having fan blades 136. The push fan assembly 120 also includes a constriction/restriction flow path 138.

The pull fan assembly 140 includes a push fan housing 142 having a pull fan top 144, a pull fan bottom 146, pull fan sides 148, and a pull fan interior 152 including a pull fan 154 having fan blades 156. The pull fan assembly 140 also includes an exhaust flow path 158.

Figure 1A:
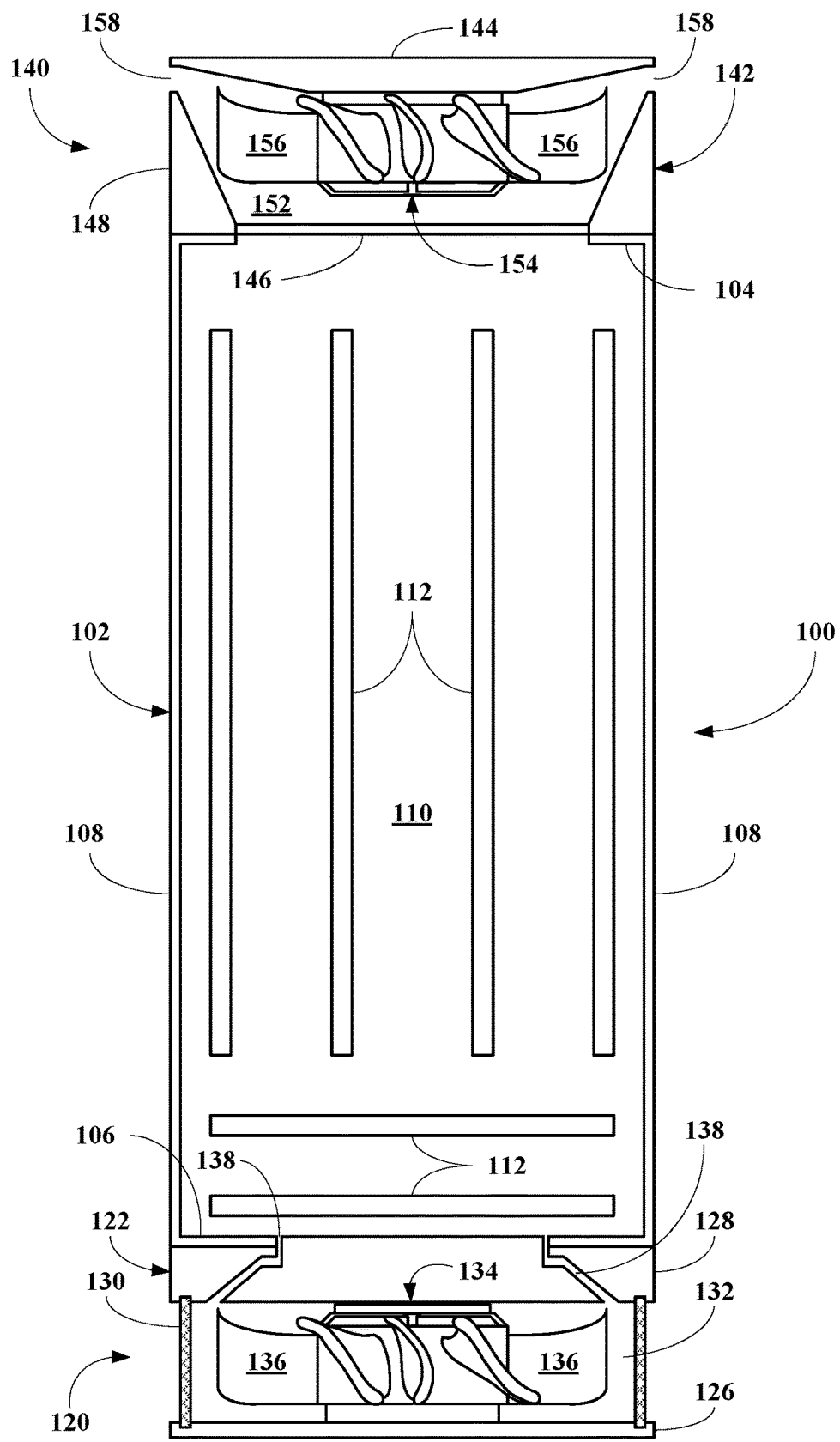
Figure 1B:
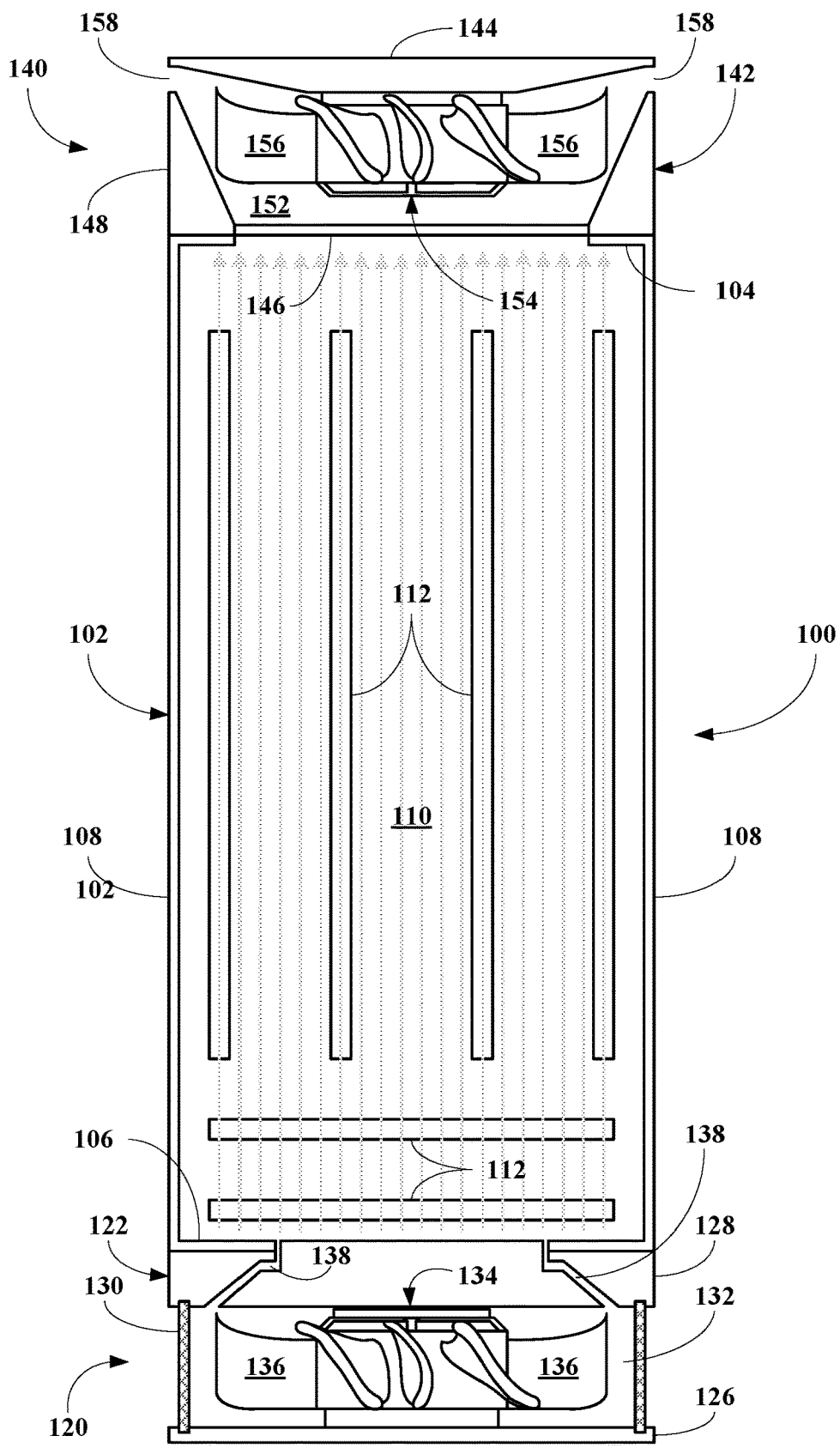
Figure 1C:
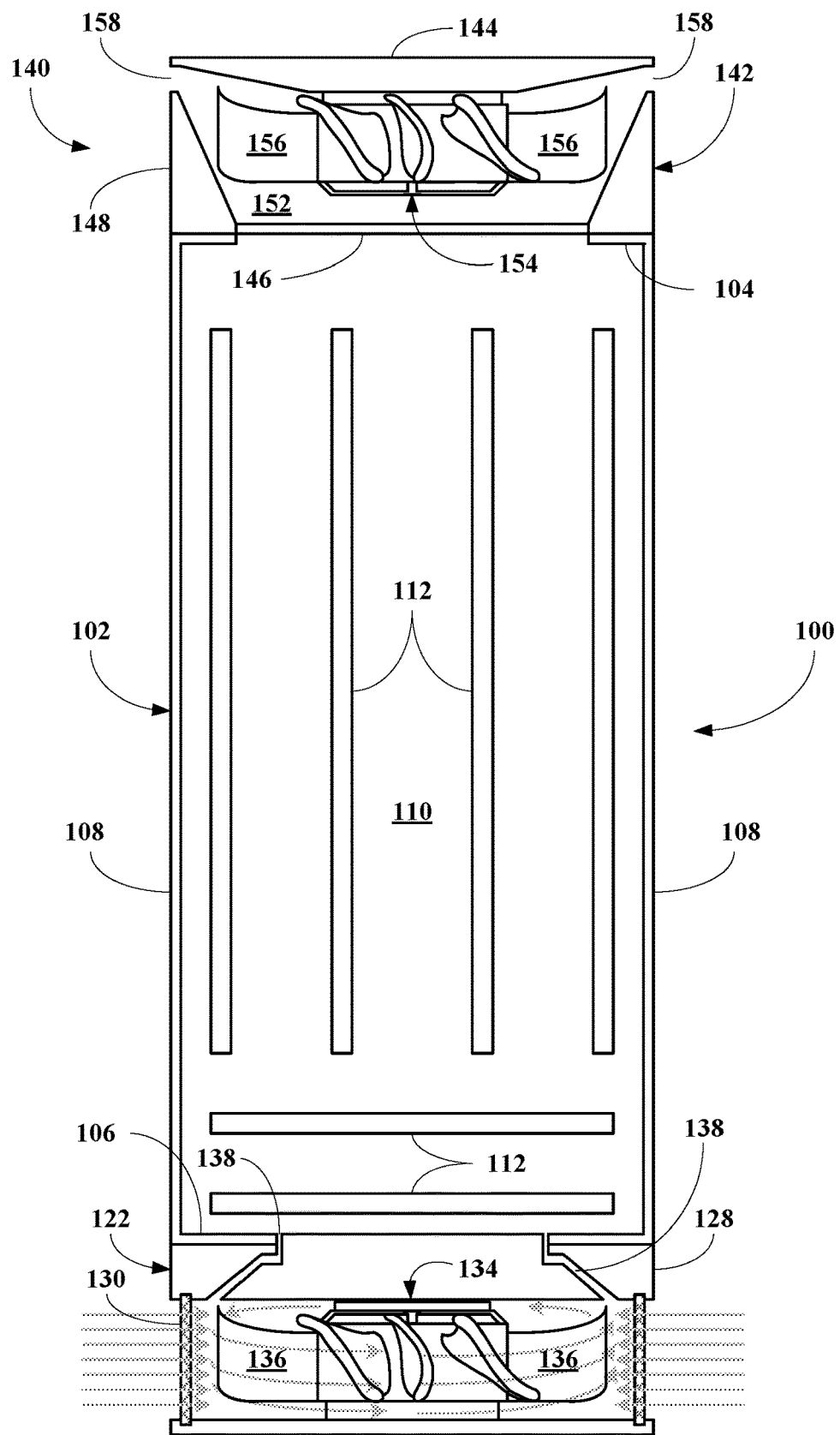
Figure 1D:
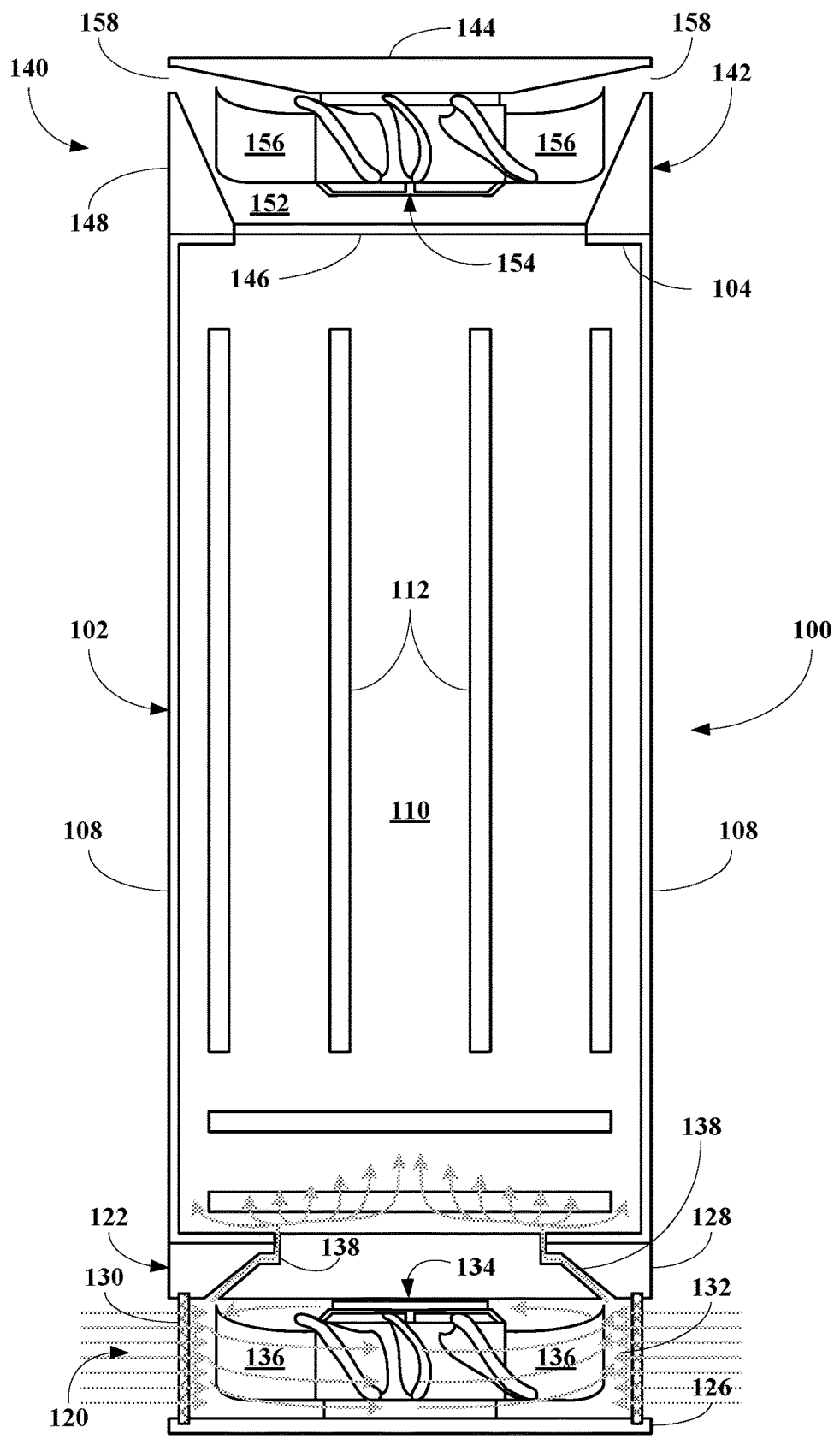
Figure 1E:
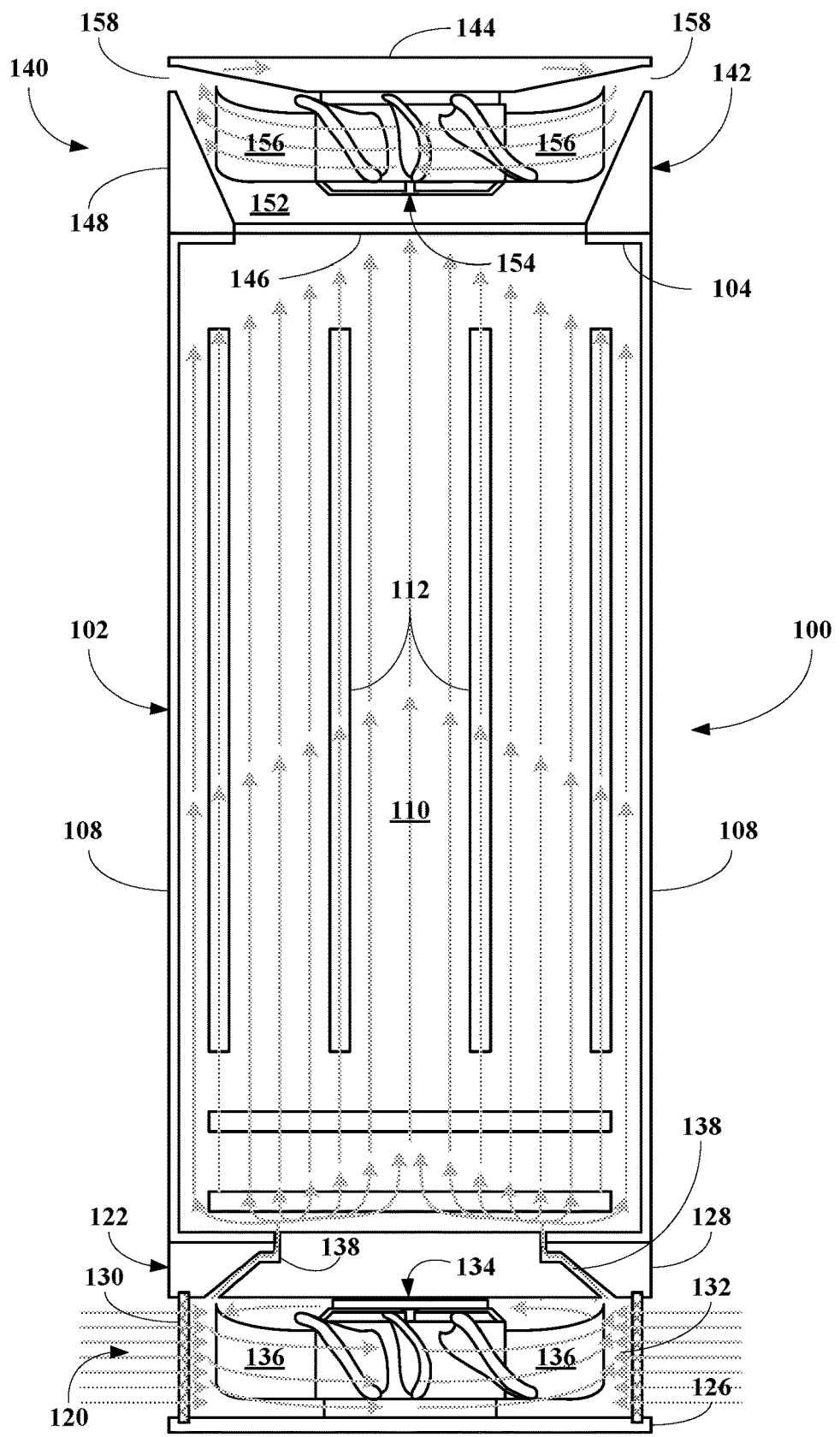
Figure 1F:
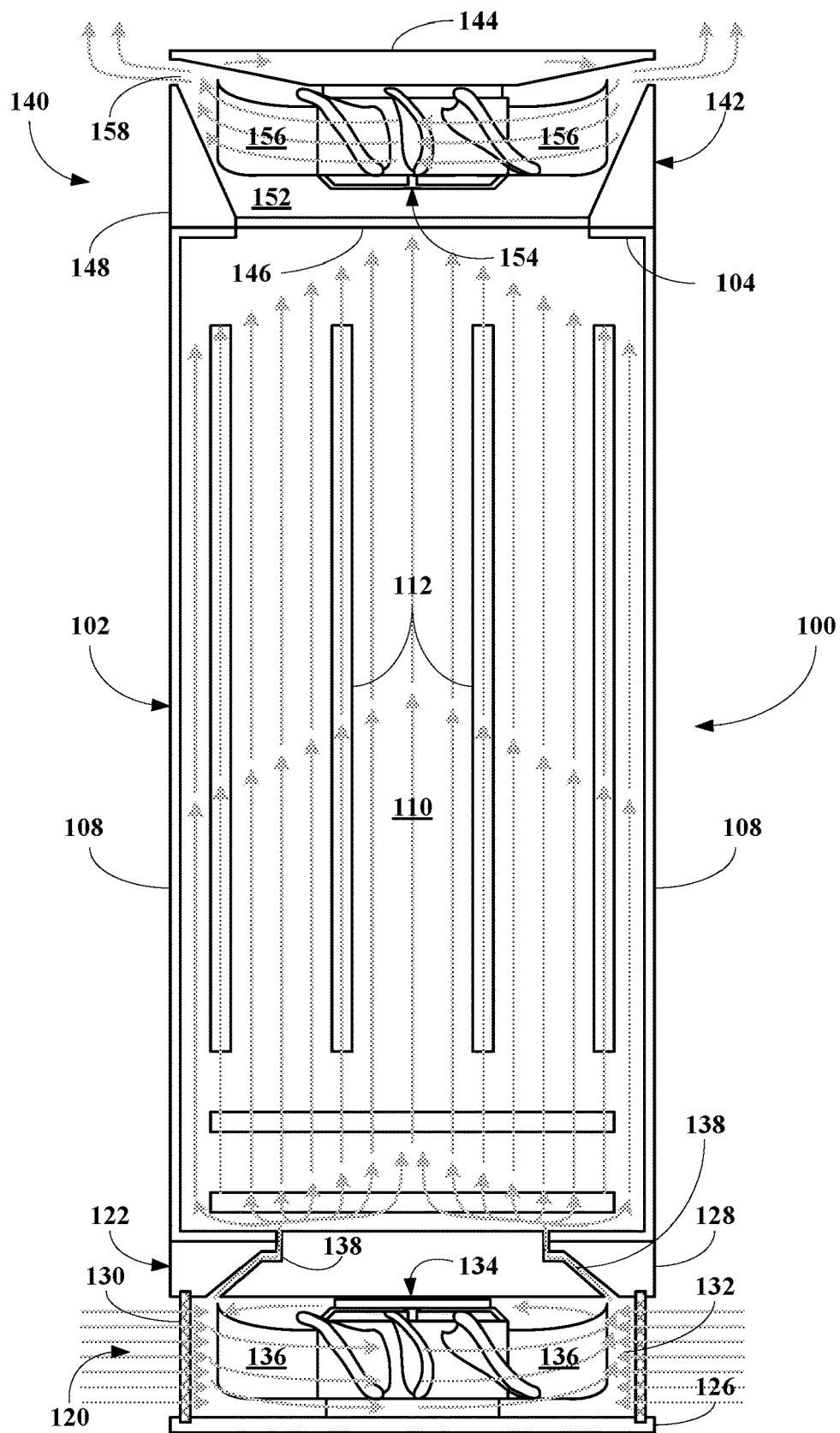

Looking at FIG. 1B, heat flow is shown by light gray arrowed lines. Looking at FIG. 1C, the pull fan 134 pulls air from the surroundings in through the screen 130 around interior due to rotation of the fan blades 136 as shown by darker gray arrowed lines. Looking at FIG. 1D, the air flows through the constriction/restriction flow path 138 and into the interior 110 of the housing 102. Looking at FIG. 1E, the air flows up through the interior and into the pull fan 154. Looking at FIG. 1F, the air flows out of the exhaust flow path 158.

Referring now to FIGS. 2A-E, another embodiment of a push-pull cooling system/apparatus, generally 200, is shown to include a housing 202 having a top 204, a bottom 206, sides 208, and an interior 210 including electronic components 212 to be cooled. The apparatus 200 also includes a push fan assembly 220 disposed on or at the bottom 206 of the housing 202 and a pull fan assembly 240 disposed on or at the top 204 of the housing 202 and heat flow is shown by light gray arrowed lines.

The push fan assembly 220 includes a push fan housing 222 having a push fan top 224, a push fan bottom 226, push fan sides 228 having screens 230, and a push fan interior 232 including a push fan 234 having fan blades 236. The push fan assembly 220 also includes a constriction/restriction flow path 238.

The pull fan assembly 240 includes a push fan housing 242 having a pull fan top 244, a pull fan bottom 246, pull fan sides 246, a screen 250 situated in the bottom 246, and a pull fan interior 252 including a pull fan 254 having fan blades 256. The pull fan assembly 240 also includes an exhaust flow path 258.

Figure 2A:
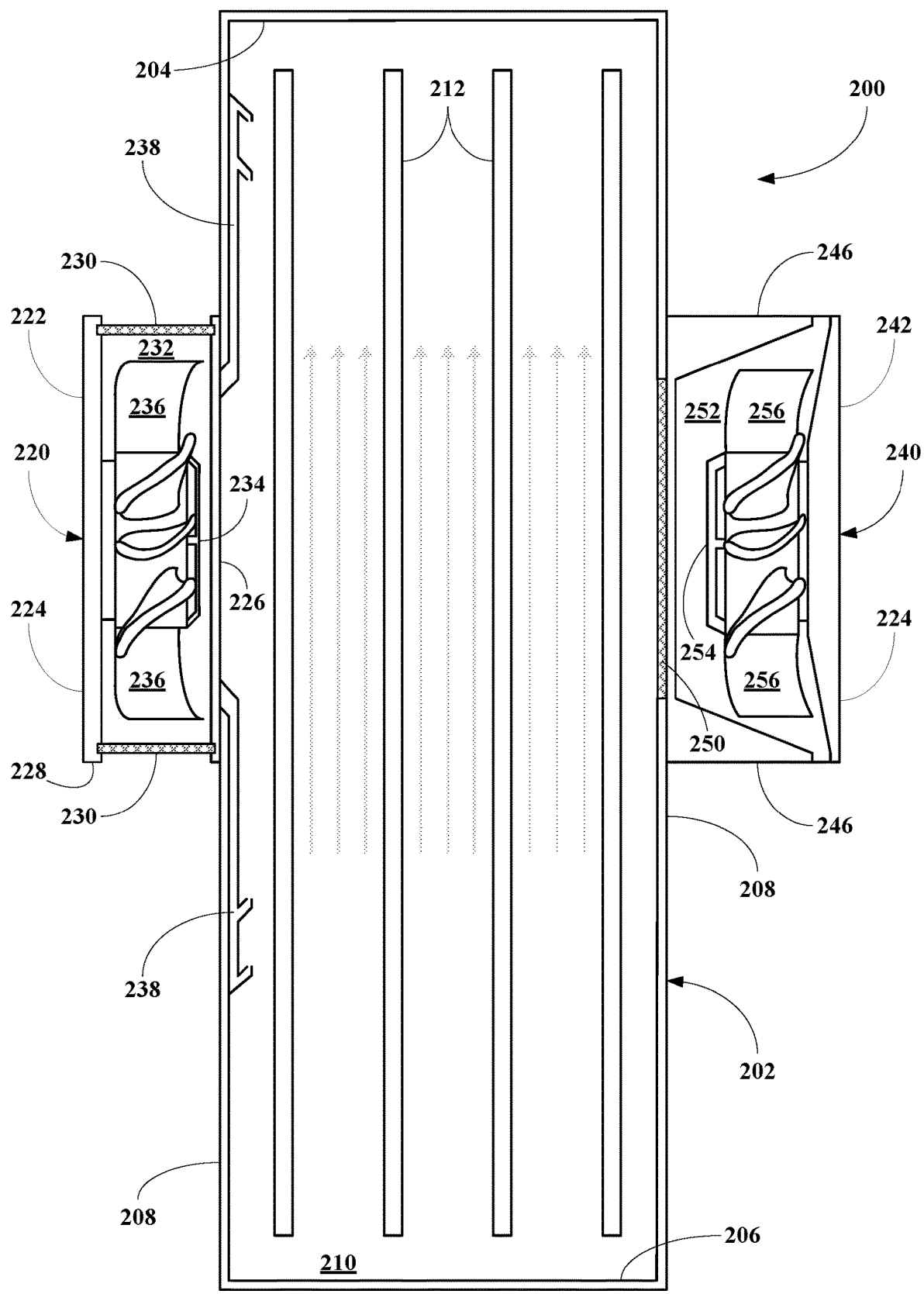
Figure 2B:
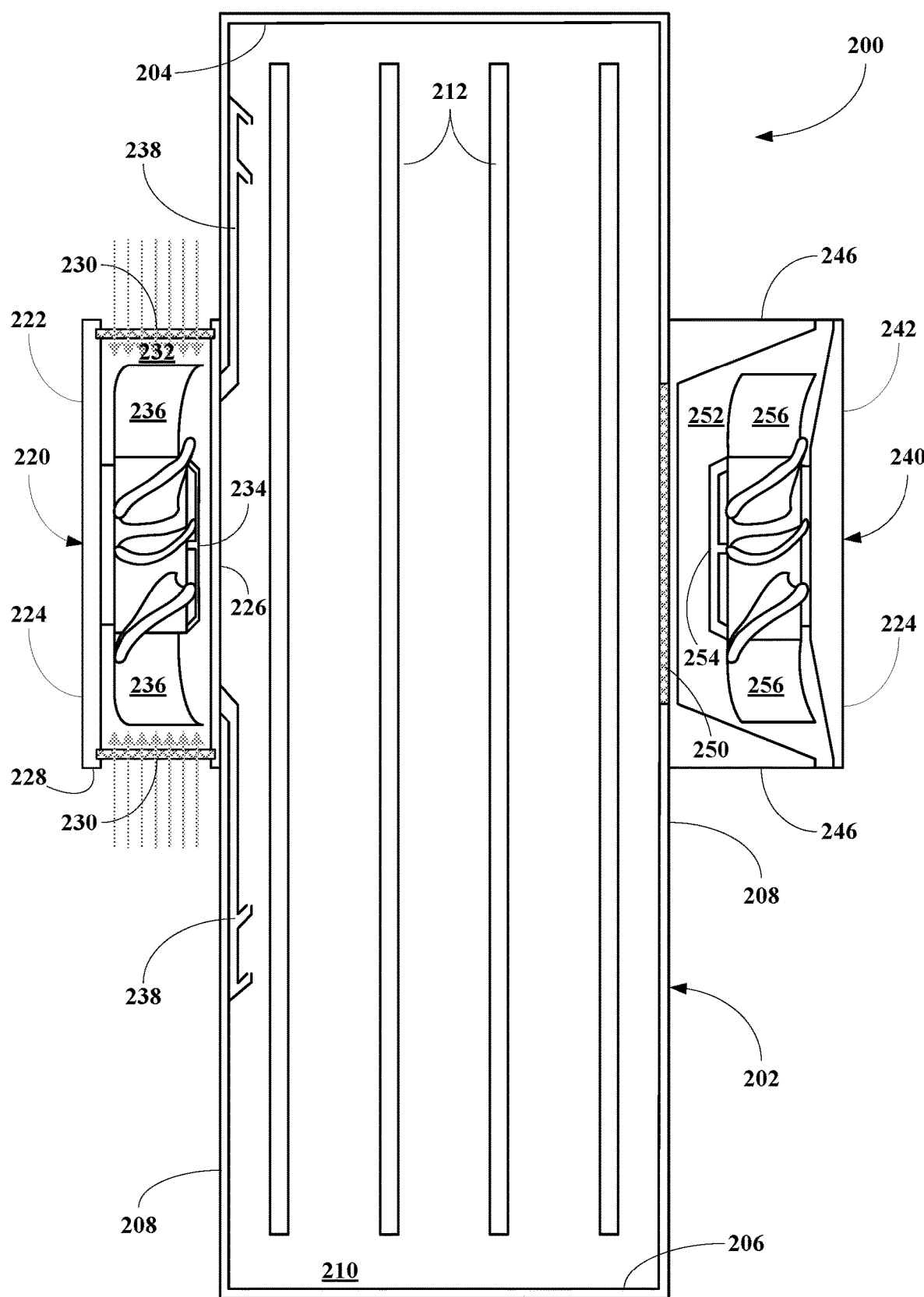
Figure 2C:
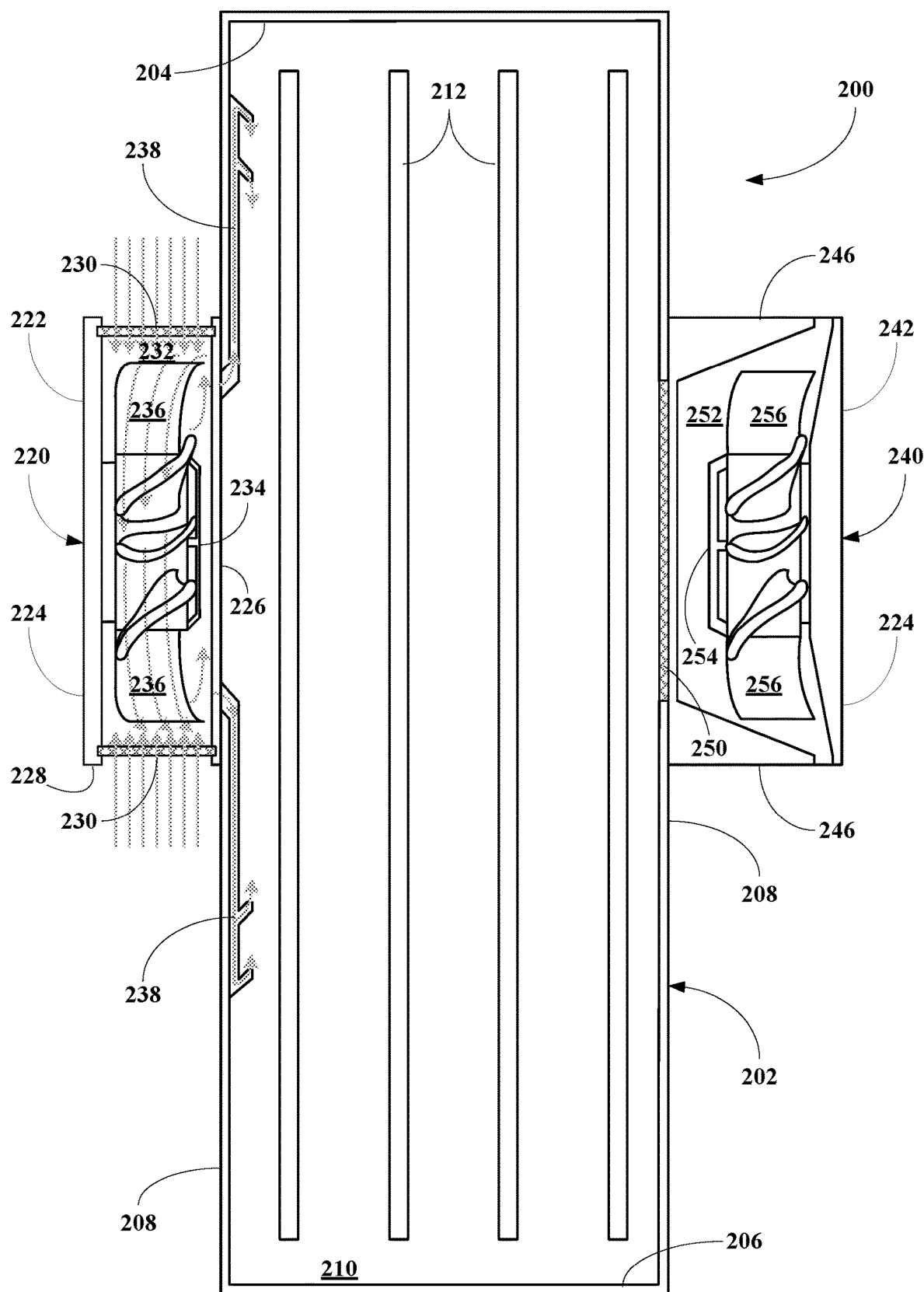
Figure 2D:
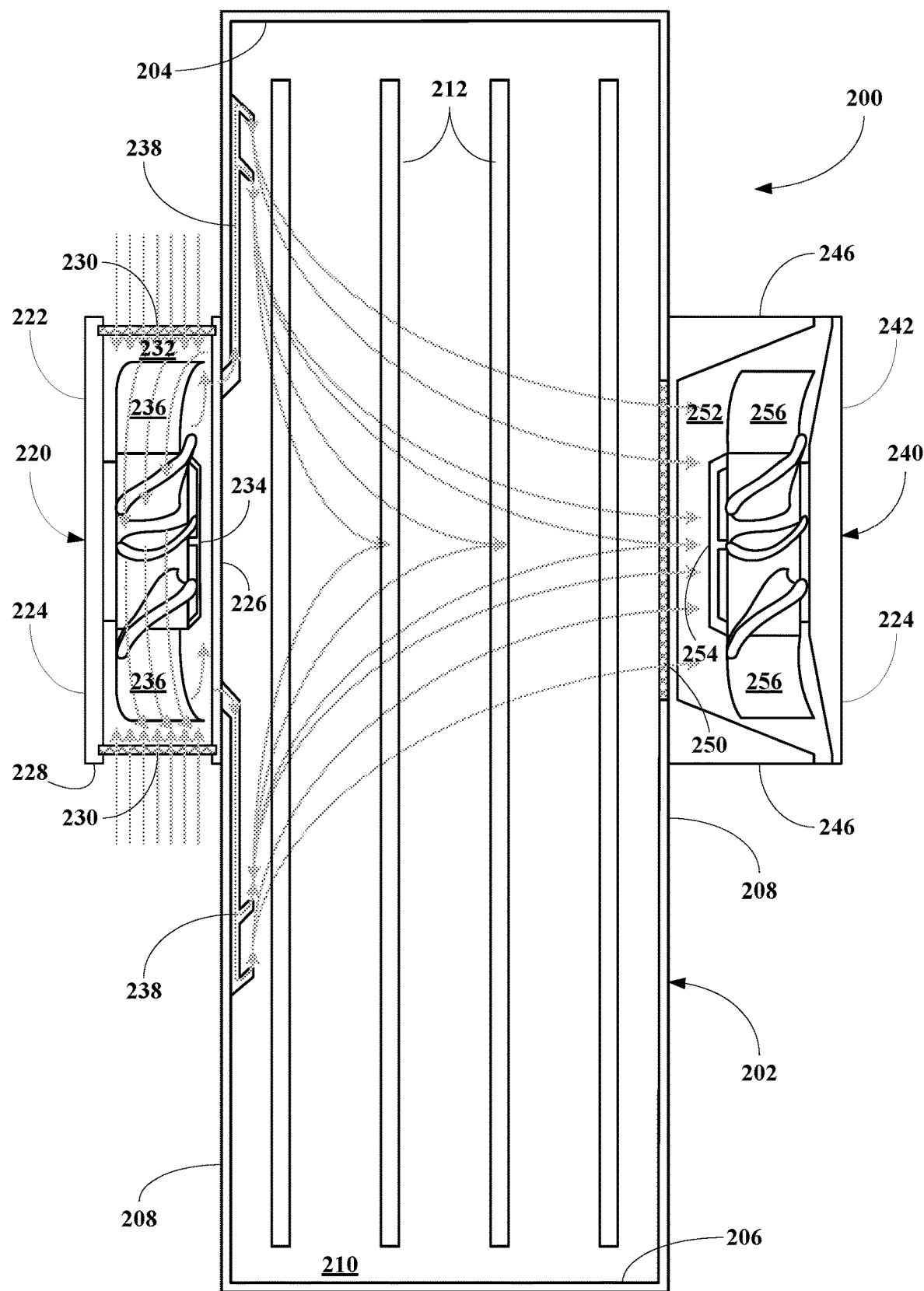
Figure 2E:
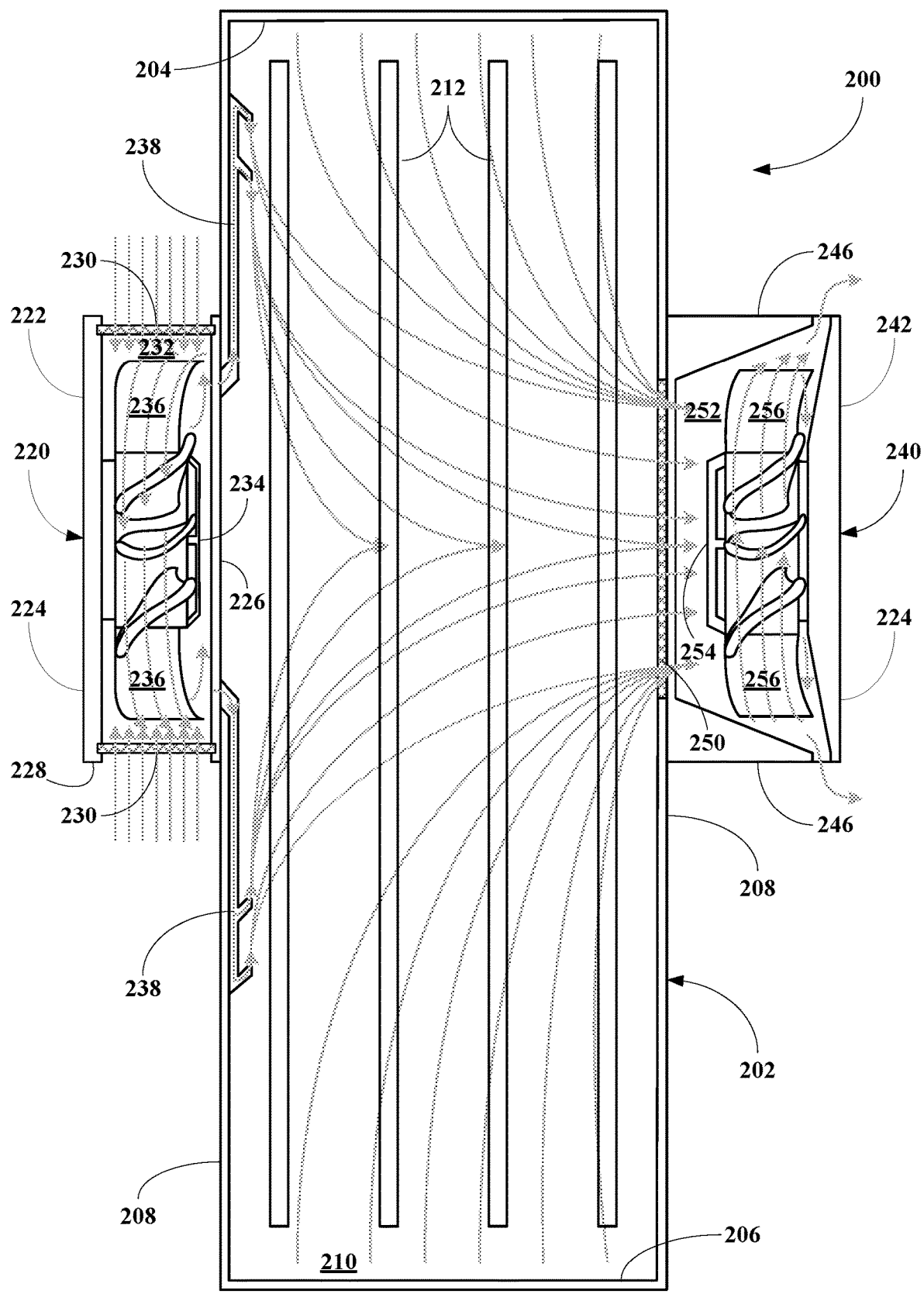

Looking at FIG. 2B, the pull fan 234 pulls air from the surroundings in through the screen 230 around interior due to rotation of the fan blades 236 as shown by darker gray arrowed lines. Looking at FIG. 2D, the air flows through the constriction/restriction flow path 238 and into the interior 210 of the housing 202. Looking at FIG. 2E, the air flows up through the interior and into the pull fan 254 and out of the exhaust flow path 258.

Figure 3:
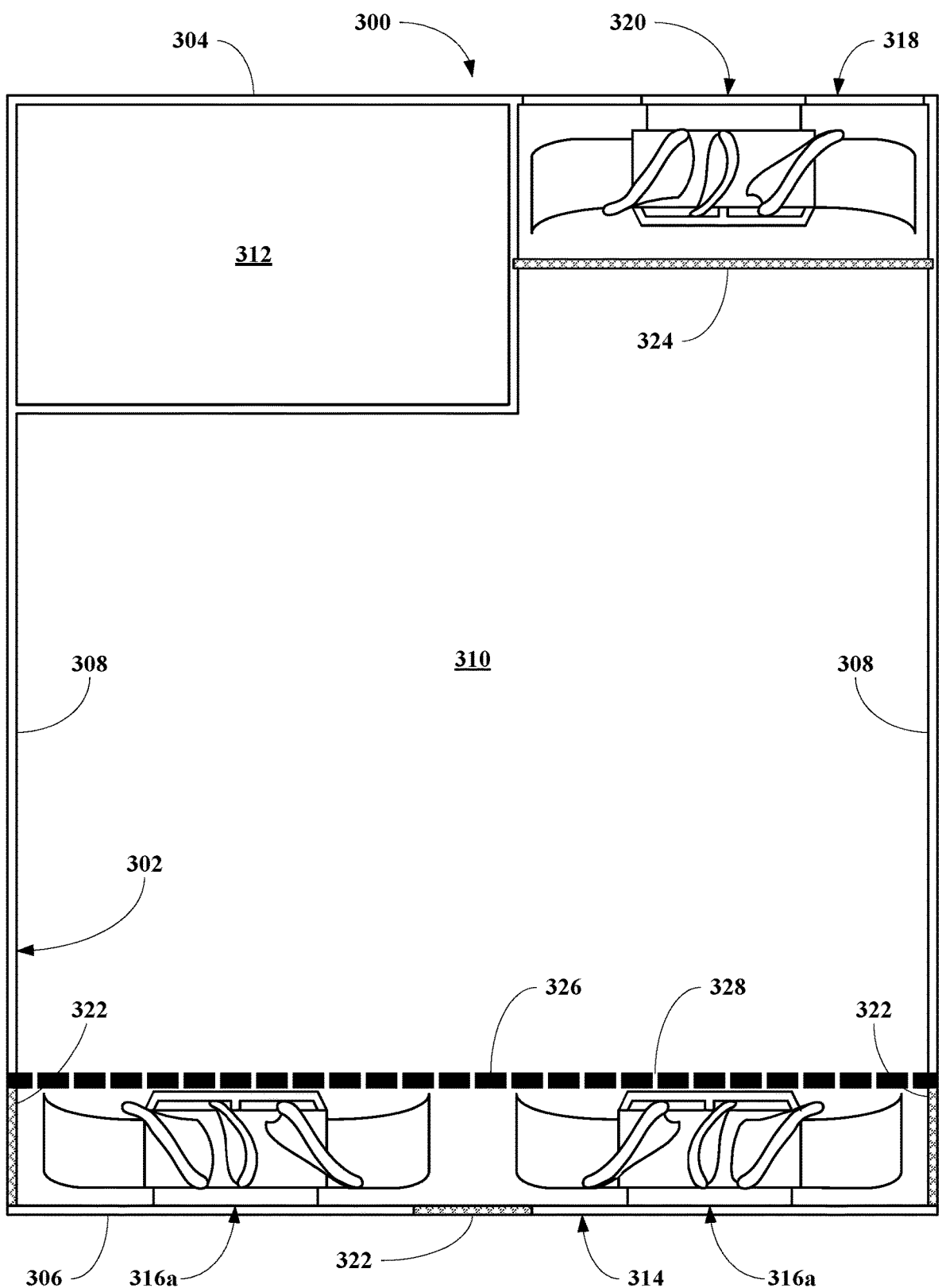
FIG. 3 depicts another embodiment of an apparatus of this disclosure including another push-pull fan configuration.

Referring now to FIG. 3, another embodiment of a push-pull cooling system/apparatus, generally 300, is shown to include a housing 302 having a top 304, a bottom 306, sides 308, and an interior 310 to be cooled, and a power supply housing 312. The apparatus 300 also includes a push fan assembly 314 disposed on or at the bottom 306 of the housing 302 including two push fans 316a&b and a pull fan assembly 318 including a single pull fan 320 disposed on or at the top 304 of the housing 302. The apparatus 300 also include intake screens 322, an interior screen 324, and a member 326 including constriction/restriction flow paths 328 therethrough.

Figure 4:
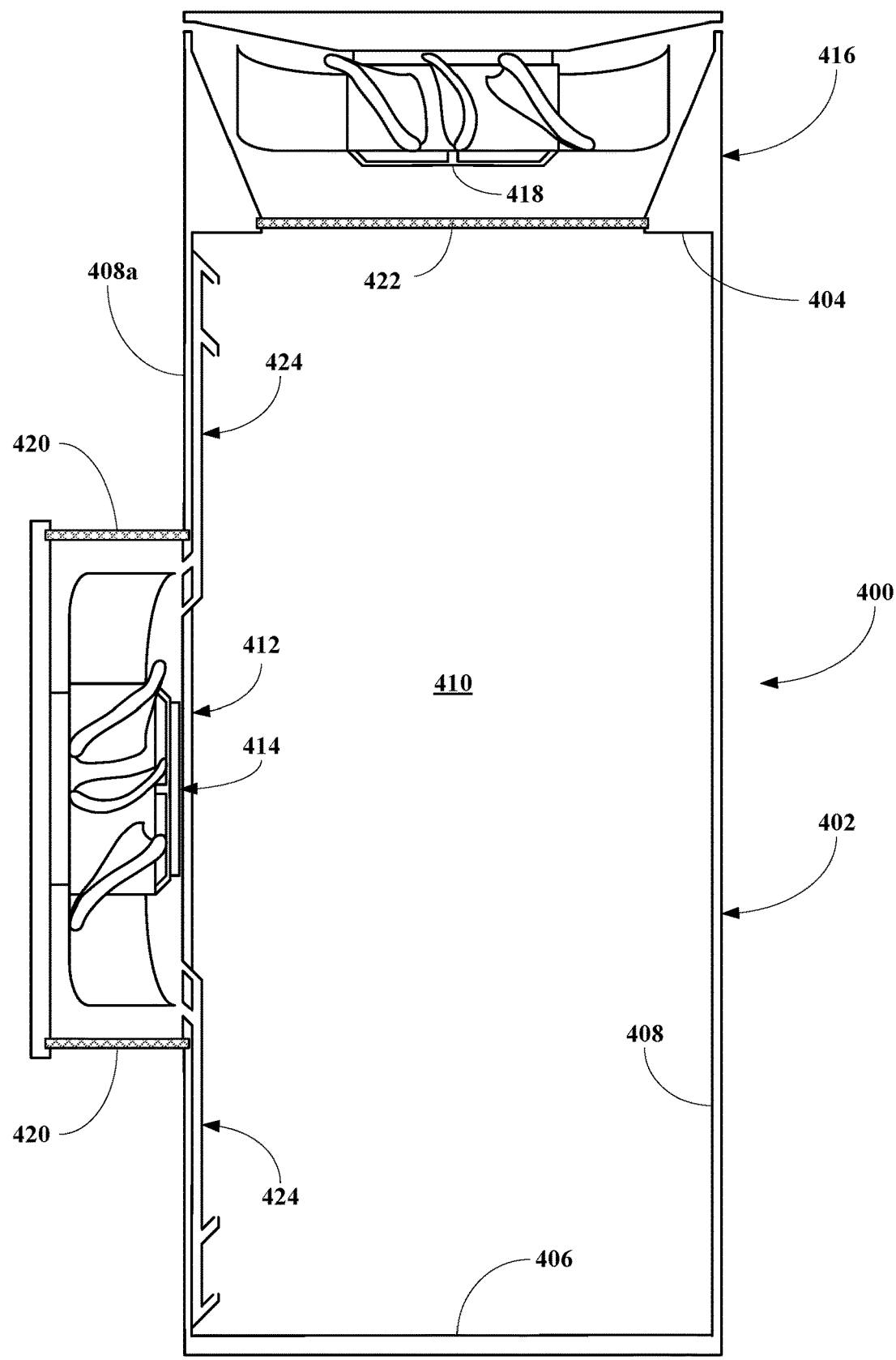
FIG. 4 depicts another embodiment of an apparatus of this disclosure including another push-pull fan configuration.

Referring now to FIG. 4, another embodiment of a push-pull cooling system/apparatus, generally 400, is shown to include a housing 402 having a top 404, a bottom 406, sides 408, and an interior 410 to be cooled. The apparatus 400 also includes a push fan assembly 412 disposed on or at the left side 408a of the housing 402 including a push fan 414 and a pull fan assembly 416 disposed on or at the top 404 of the housing 402 and include a pull fan 418. The apparatus 400 also include intake screens 420, an interior screen 422, and constriction/restriction flow paths 424.

Figure 5:
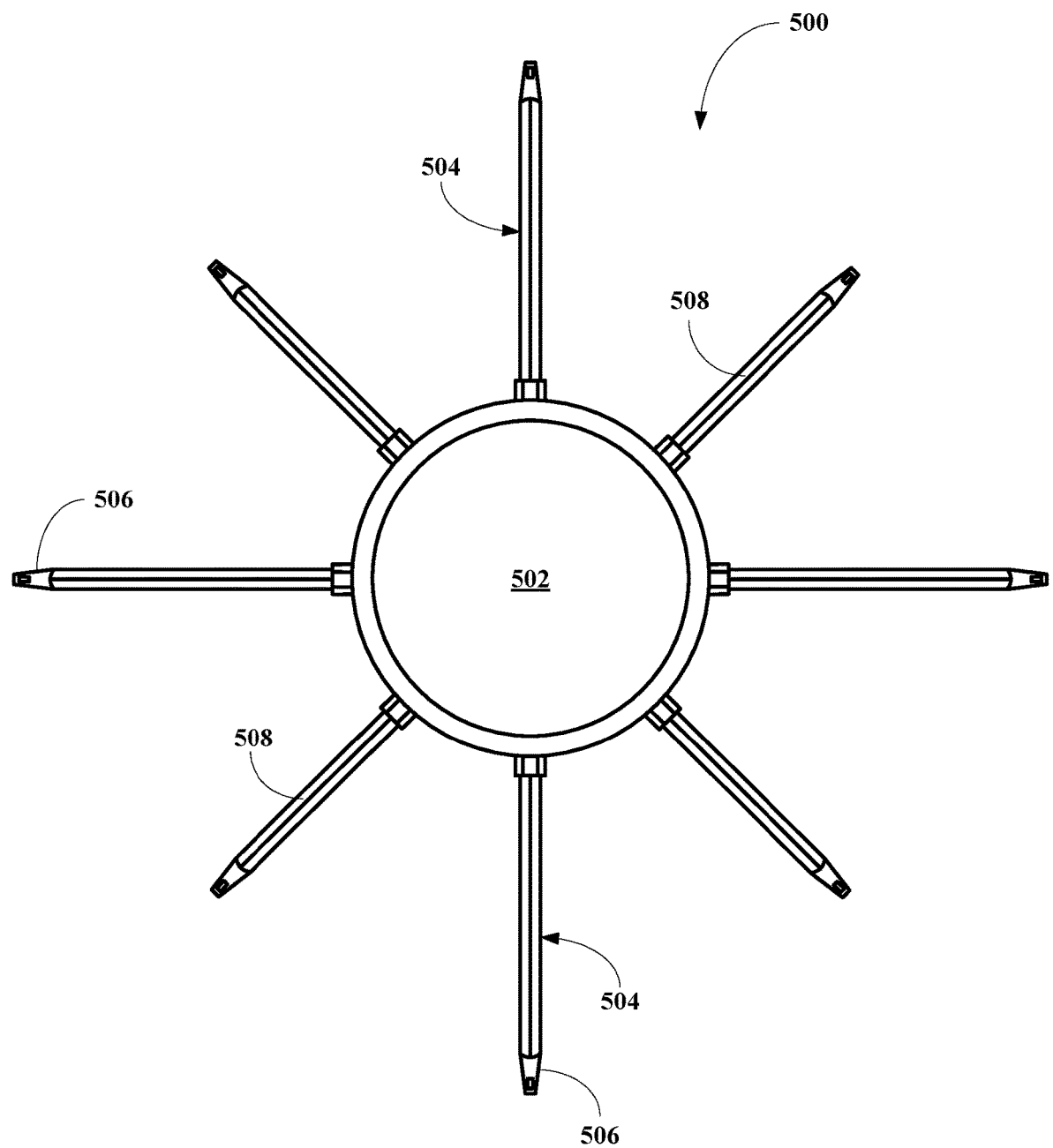
FIG. 5 depicts an embodiment of a fan housing including a plurality of radially configured constriction air channels.

Referring now to FIG. 5, an embodiment of a fan assembly, generally 500, is shown to include a housing 502 having radially extending members 504 extending out from the housing and terminating in nozzles 506 defining constriction/restriction flow paths 508.

Referring now to FIG. 6A, an embodiment of a constriction/restriction flow path assembly, generally 600, is shown to include a flow conduit 602 having a distal end 604 and including a control valve 606 controlled by a microprocessor 608.

Figure 6B:
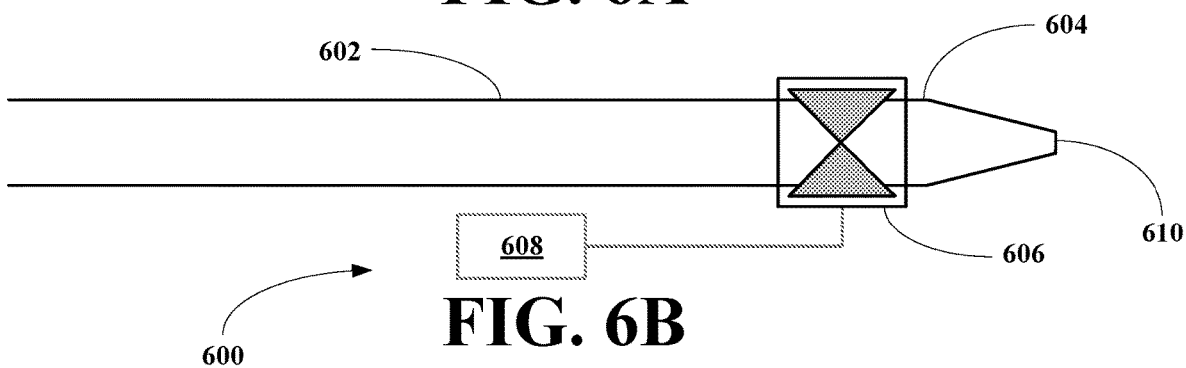

Referring now to FIG. 6B, another embodiment of a constriction/restriction flow path assembly, generally 600, is shown to include the flow conduit 602 having the distal end 604 and including the control valve 606 controlled by the microprocessor 608. The distal end 604 terminates in a nozzle 610.

Referring now to FIG. 7A, an embodiment of a constriction/restriction flow path assembly, generally 700, is shown to include a flow conduit 702 having a compression chamber 704 and a distal end 706 and including a control valve 708 controlled by a microprocessor 710.

Figure 7B:
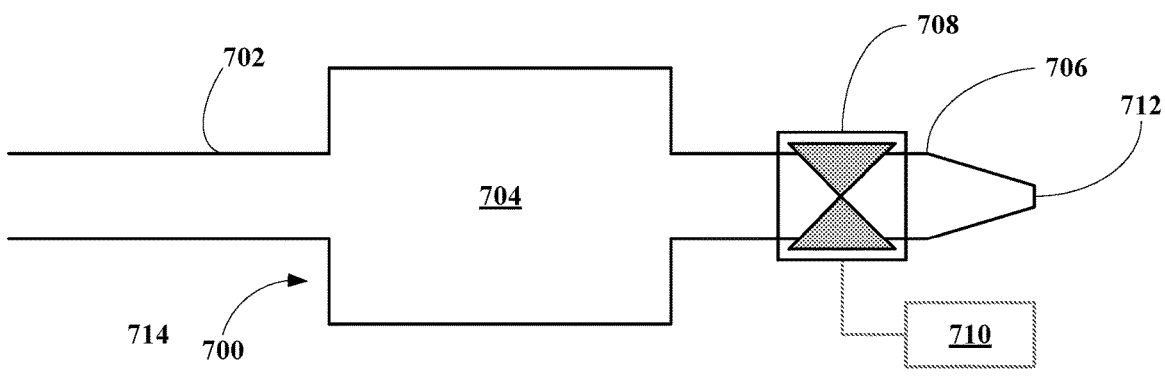

Referring now to FIG. 7B, another embodiment of a constriction/restriction flow path assembly, generally 700, is shown to include the flow conduit 702 having the compression chamber 704 and the distal end 706 and including the control valve 708 controlled by the microprocessor 710. The distal end 704 terminates in a nozzle 712.

Figure 8A:
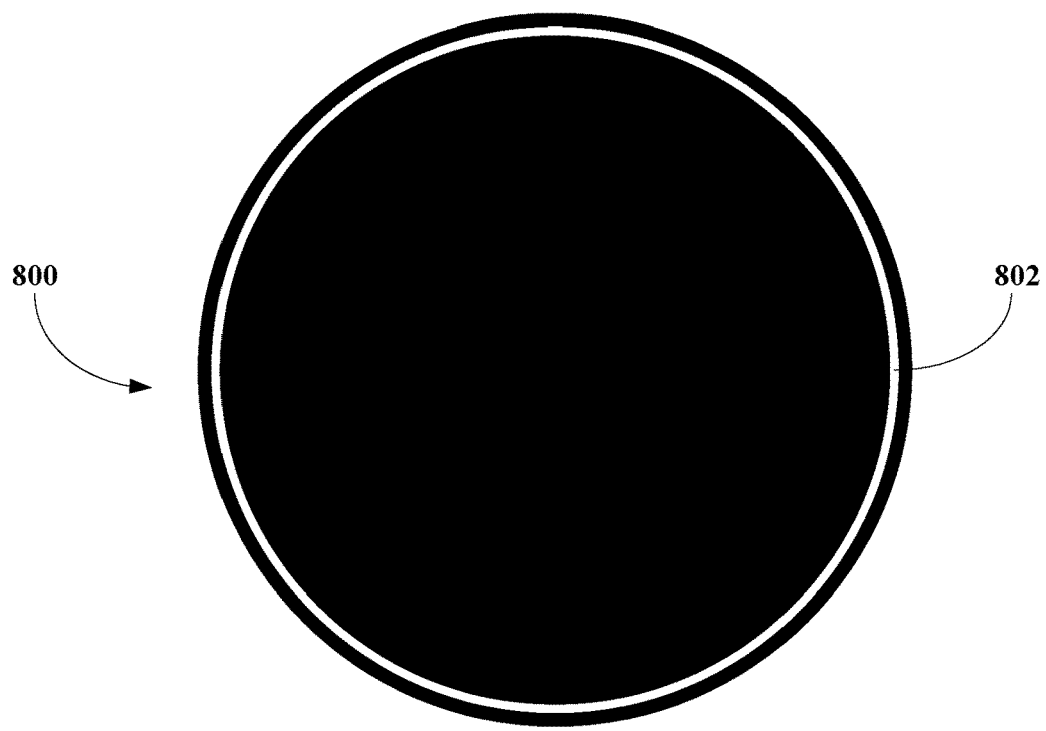

Referring now to FIG. 8A, an embodiment of a constriction/restriction flow member, generally 800, is shown to include a constriction/restriction flow path 802.

Figure 8B:
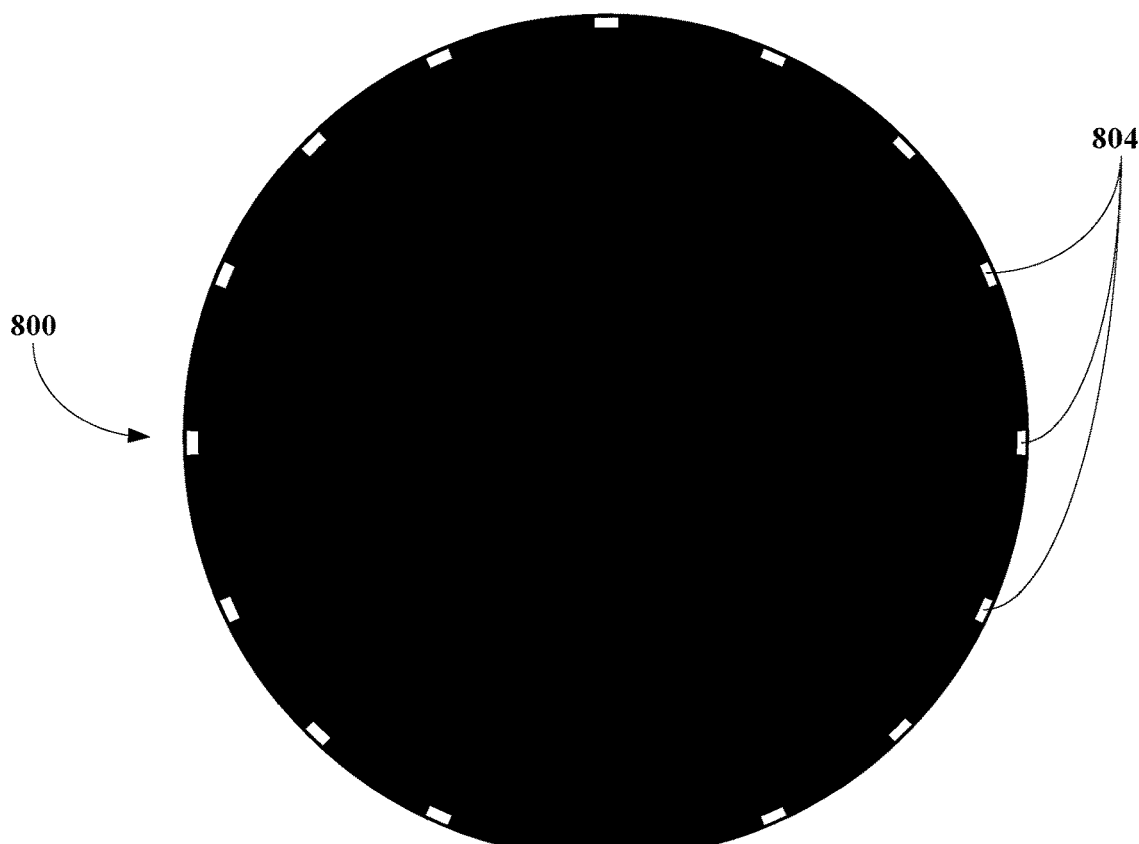

Referring now to FIG. 8B, another embodiment of the constriction/restriction flow member, generally 800, is shown to include radially constriction/restriction flow paths 804.

Figure 8C:
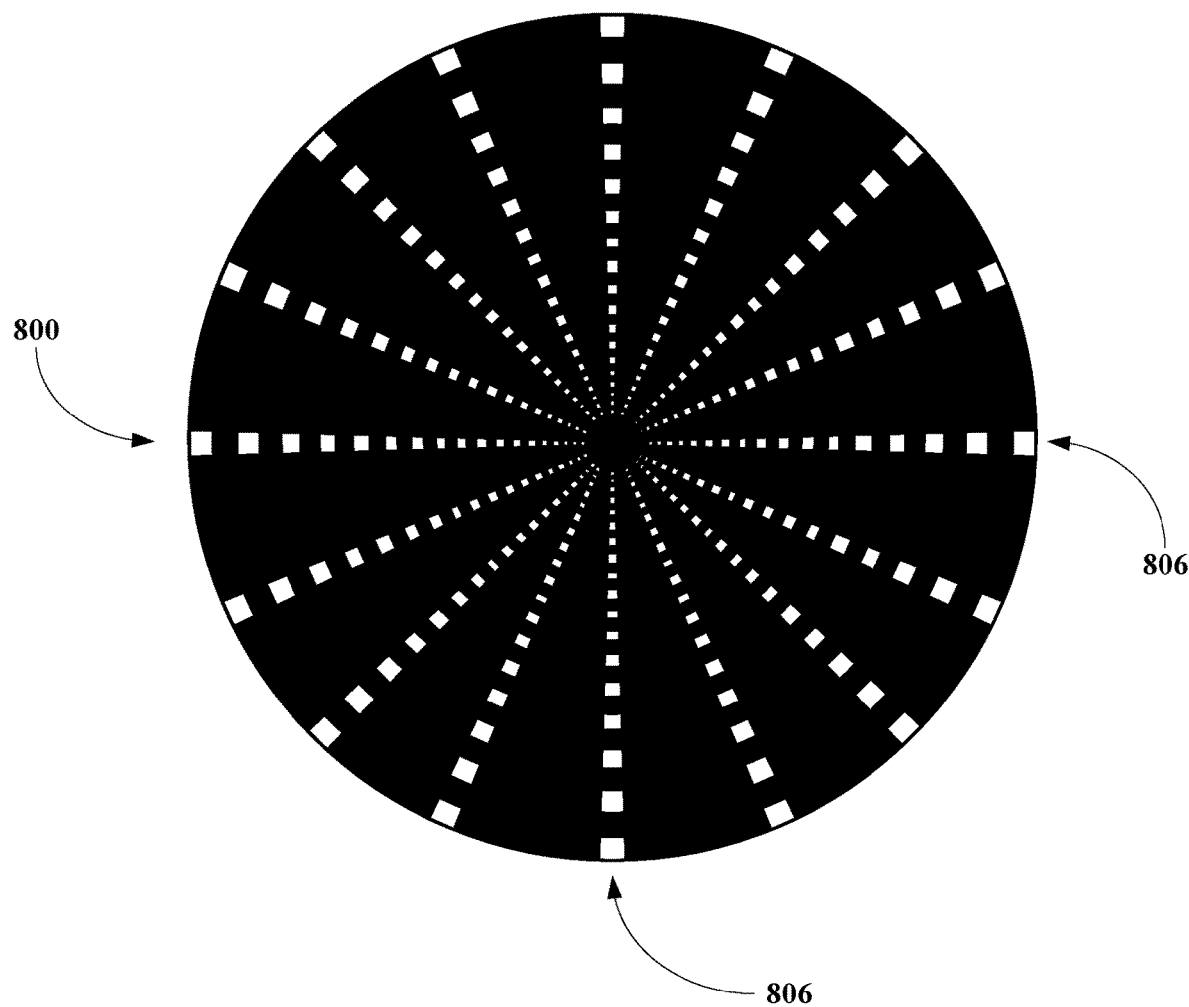

Referring now to FIG. 8C, another embodiment of the constriction/restriction flow member, generally 800, is shown to include radially and concentrically distributed constriction/restriction flow paths 806.

Figure 8D:
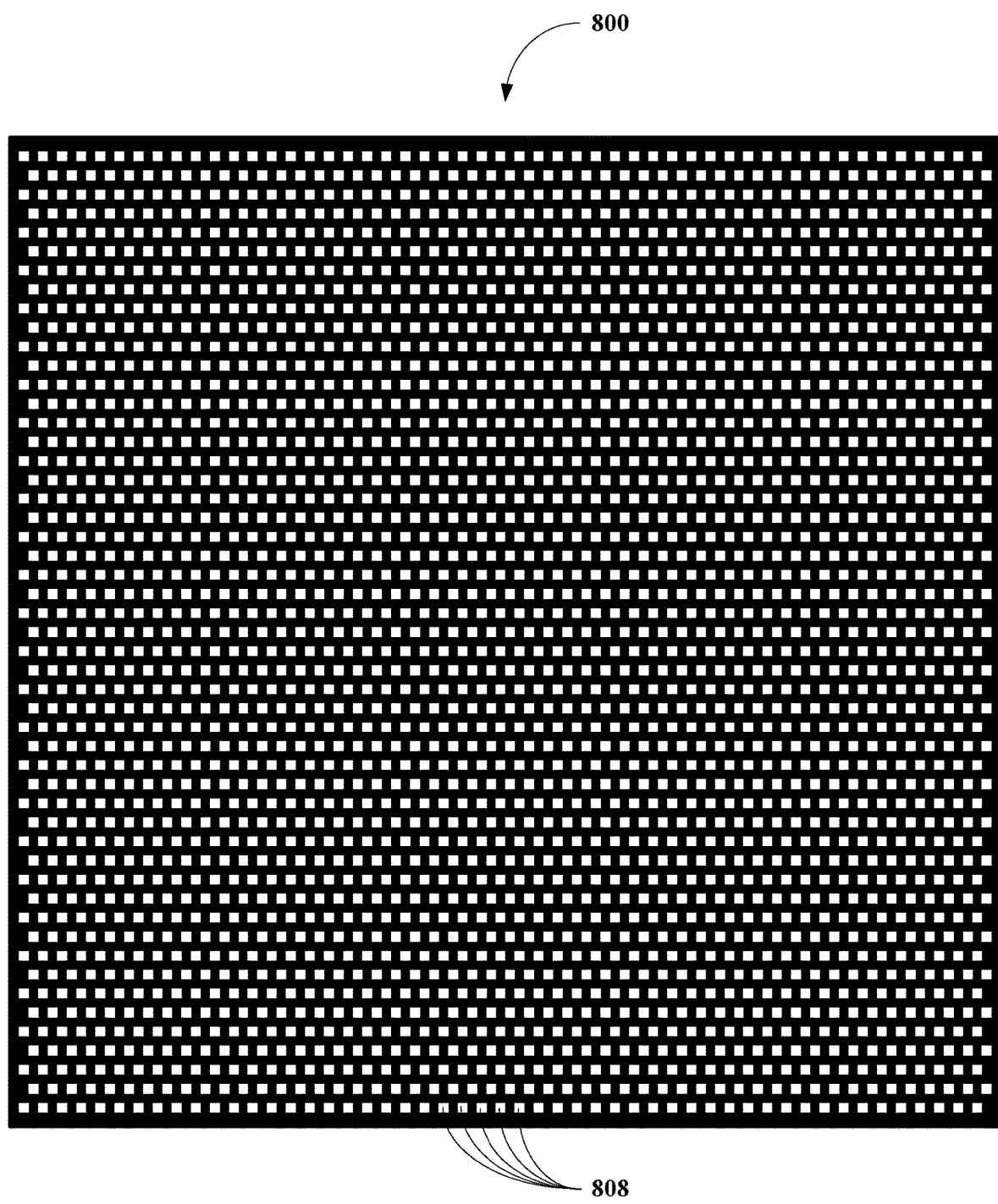

Referring now to FIG. 8D, another embodiment of the constriction/restriction flow member, generally 800, is shown to include rectangularly distributed constriction/restriction flow paths 808.

Figure 8H:
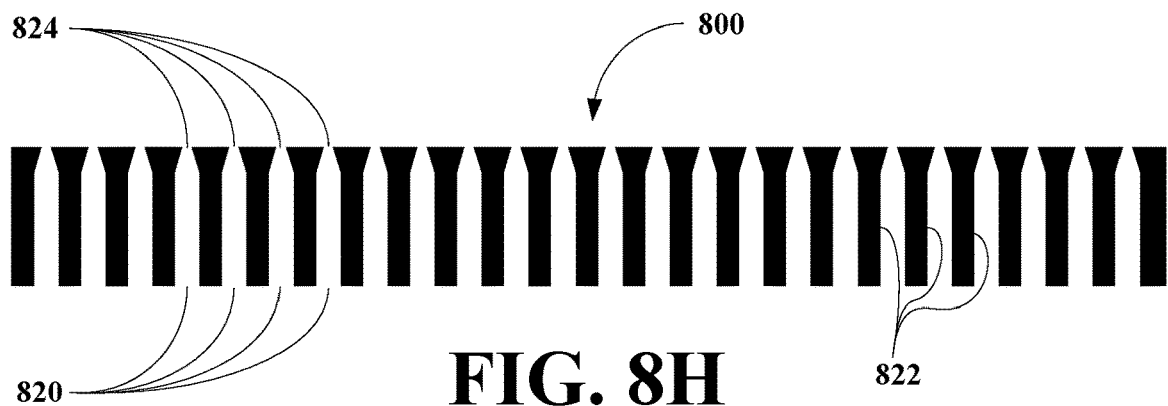
Figure 8G:
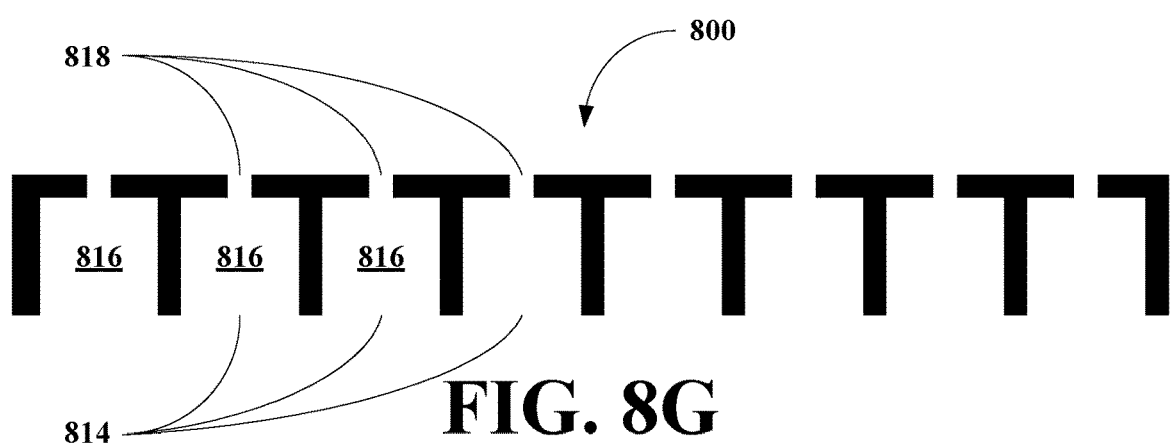
Figure 8F:
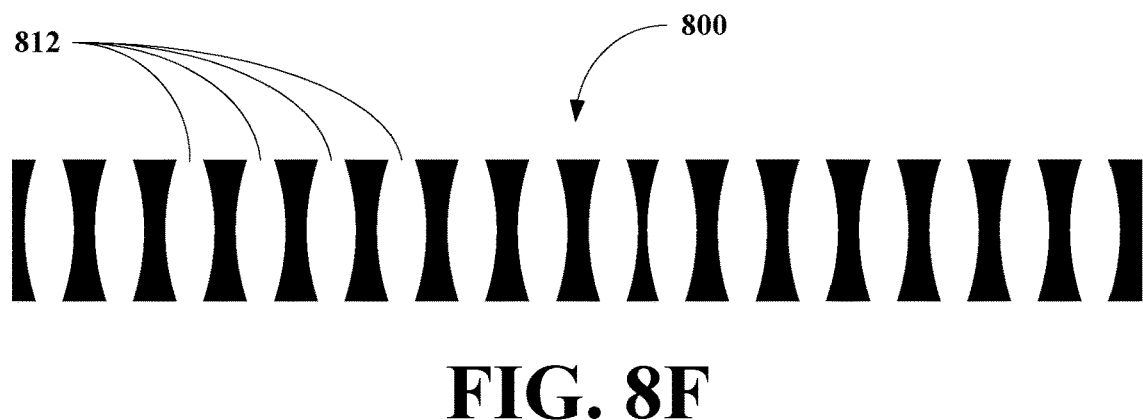
Figure 8E:
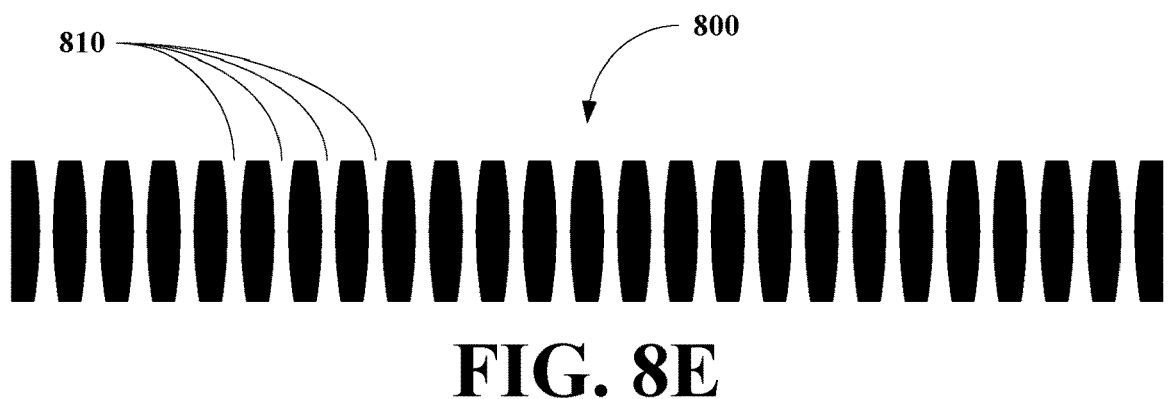

Referring now to FIG. 8E, another embodiment of the constriction/restriction flow member, generally 800, is shown to include concave constriction/restriction flow paths 810.

Referring now to FIG. 8F, another embodiment of the constriction/restriction flow member, generally 800, is shown to include convex constriction/restriction flow paths 812.

Referring now to FIG. 8G, another embodiment of the constriction/restriction flow member, generally 800, is shown to include constriction/restriction flow paths 814 having compression chamber 816 and straight shaped openings 818.

Referring now to FIG. 8H, another embodiment of the constriction/restriction flow member, generally 800, is shown to include constriction/restriction flow paths 820 having straight portions 822 and nozzle shaped openings 824.

These members may be used with any of the push-pull fan apparatuses described herein.

Referring now to FIGS. 9A&B, top plan and side plan views of an embodiment of a push fan assembly, generally 900, is shown to include a housing 902, unidirectional valves 904, and a flow path member 906 having constriction/restriction flow paths 908.

Closing Paragraph of the Disclosure

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A cooling apparatus comprising: a housing including an interior to be cooled: a push fan assembly including: at least one push fan, at least one intake, and at least one constriction/restriction outlet pathway; and a put fan assembly including: at least one put fan, and at least one exhaust pathway, wherein the push fan assembly and the put fan assembly comprise a push/pull fan configuration, whereby air is compressed as it enters the at least one constriction/restriction outlet pathway and expands and cools as it leaves the at least one constriction/restriction outlet pathway increasing the cooling efficiency of the push/pull fan configuration; wherein each of the constriction/restriction outlet pathways includes a compression chamber and a control valve.

2. The apparatus of claim 1, wherein the at least one constriction/restriction outlet pathway includes a member defining a plurality of constriction/restriction outlet pathways.

3. The apparatus of claim 1, wherein:
the push fan assembly is disposed in or on a bottom of the housing and the pull fan assembly is disposed in or on a top of the housing,
or
the push fan assembly is disposed in or on a side of the housing and the pull fan assembly is disposed in or on a top of the housing,
or
the push fan assembly is disposed in or on a side of the housing and the pull fan assembly is disposed in or on an opposite side of the housing.

4. The apparatus of claim 1, wherein:
the push fan assembly include a plurality push fans, and/or
the pull fan assembly include a plurality pull fans.

5. A cooling apparatus comprising:
a housing including an interior to be cooled;
a push fan assembly including:
 at least one push fan,
 at least one intake, and
 a plurality of constriction/restriction outlet pathways; and
a pull fan assembly including:
 at least one pull fan, and
 at least one exhaust pathway,
wherein the push fan assembly and the pull fan assembly comprise a push/pull fan configuration, whereby air is compressed as it enters the at least one constriction/restriction outlet pathway and expands and cools as it leaves the at least one constriction/restriction outlet pathway increasing the cooling efficiency of the push/pull fan configuration.

6. The apparatus of claim 5, wherein:
the push fan assembly is disposed in or on a bottom of the housing and the pull fan assembly is disposed in or on a top of the housing,
or
the push fan assembly is disposed in or on a side of the housing and the pull fan assembly is disposed in or on a top of the housing,
or
the push fan assembly is disposed in or on a side of the housing and the pull fan assembly is disposed in or on an opposite side of the housing.

7. The apparatus of claim 5, further comprising:
a member defining the plurality of constriction/restriction outlet pathways.

8. The apparatus of claim 5, wherein:
the push fan assembly include a plurality push fans, and/or
the pull fan assembly include a plurality pull fans.

9. The apparatus of claim 1, wherein push fan assembly includes a plurality of constriction/restriction outlet pathways.

10. The apparatus of claim 5, wherein push fan assembly includes a plurality of constriction/restriction outlet pathways.

* * * * *